(12) United States Patent
Yap

(10) Patent No.: US 10,870,460 B2
(45) Date of Patent: Dec. 22, 2020

(54) COMPACT FOLDING ELECTRIC BICYCLE

(71) Applicant: Fook Fah Yap, Singapore (SG)

(72) Inventor: Fook Fah Yap, Singapore (SG)

( * ) Notice: Subject to any disclaimer, the term of this patent is extended or adjusted under 35 U.S.C. 154(b) by 253 days.

(21) Appl. No.: 16/232,295

(22) Filed: Dec. 26, 2018

(65) Prior Publication Data

US 2019/0202520 A1 Jul. 4, 2019

Related U.S. Application Data

(60) Provisional application No. 62/612,192, filed on Dec. 29, 2017.

(51) Int. Cl.
| | | |
|---|---|---|
| *B62K 15/00* | (2006.01) | |
| *B62K 21/24* | (2006.01) | |
| *B62K 11/02* | (2006.01) | |
| *B62M 6/60* | (2010.01) | |

(52) U.S. Cl.
CPC ............ *B62K 15/008* (2013.01); *B62K 11/02* (2013.01); *B62K 15/006* (2013.01); *B62K 21/24* (2013.01); *B62M 6/60* (2013.01); *B62K 2015/001* (2013.01); *B62K 2015/005* (2013.01)

(58) Field of Classification Search
CPC .... B62K 15/008; B62K 15/006; B62K 11/02; B62K 2015/001; B62K 19/00; B62K 15/00; B62K 21/16; B62K 17/00
See application file for complete search history.

(56) References Cited

U.S. PATENT DOCUMENTS

| | | |
|---|---|---|
| 4,718,688 A | 1/1988 | Sanders |
| 4,895,386 A | 1/1990 | Hellestam et al. |
| 5,398,955 A | 3/1995 | Yeh |
| 5,836,602 A | 11/1998 | Wang |

(Continued)

FOREIGN PATENT DOCUMENTS

| | | | |
|---|---|---|---|
| CN | 205311797 U | * | 6/2016 |
| EP | 0026800 B1 | | 10/1979 |

(Continued)

OTHER PUBLICATIONS

Antonio Pasolini, GizMag website: www.gizmag.com/jac-electric-scooter/25928/ , Jan. 23, 2013.

(Continued)

*Primary Examiner* — Ruth Ilan
*Assistant Examiner* — David Yeboah Asare
(74) *Attorney, Agent, or Firm* — MP Patents, LLC

(57) ABSTRACT

A vehicle is configurable between an expanded arrangement and a folded arrangement. A front wheel is rotatably and removably mounted in a front fork at a front axle. A front wheel quick release skewer configured to couple the front wheel to and decouple the front wheel from the front fork. A main frame has a head tube configured to receive the front fork and a seat tube distal therefrom. A rear wheel assembly includes a rear wheel carrier pivotably coupled with the seat tube and selectively coupled with the seat tube by seat stays. A quick release clamp is configured to enable selective pivoting of the handlebar relative to a steering tube about a pivot axis of steering tube hinge. A rear wheel carrier mount is provided to the rear wheel carrier and is configured for removable coupling of the front axle with the front wheel removed from the front fork.

20 Claims, 6 Drawing Sheets

(56) References Cited

U.S. PATENT DOCUMENTS

| | | | |
|---|---|---|---|
| 6,135,668 A | 10/2000 | Lin | |
| 6,336,649 B1 | 1/2002 | Lin | |
| 6,364,335 B1 | 4/2002 | Mombelli | |
| 6,616,154 B1 | 9/2003 | Neuhold | |
| 6,641,159 B1 | 11/2003 | Fan | |
| 6,799,771 B2 | 10/2004 | Bigot | |
| 6,986,522 B2 | 1/2006 | Sinclair et al. | |
| 7,055,842 B1* | 6/2006 | Lin | B62K 15/008 280/278 |
| 7,591,473 B2 | 9/2009 | Hon et al. | |
| 7,614,632 B2* | 11/2009 | Tak-Wei Hon | B62K 15/006 280/278 |
| 7,651,109 B2 | 1/2010 | Tong | |
| 8,162,345 B1 | 4/2012 | Szu-Yao | |
| 8,205,902 B2 | 6/2012 | Uimonen et al. | |
| 8,430,414 B1* | 4/2013 | Yap | B62K 15/008 280/278 |
| 8,465,033 B2 | 6/2013 | Benarrouch | |
| 8,505,937 B2 | 8/2013 | Epstein | |
| 8,613,458 B2 | 12/2013 | Ghisolfi et al. | |
| 8,720,918 B2 | 5/2014 | Liao | |
| 8,882,124 B2 | 11/2014 | Yap | |
| 8,894,084 B1* | 11/2014 | Yap | B62K 15/008 280/278 |
| 9,187,144 B2 | 11/2015 | Yap | |
| 9,266,579 B2 | 2/2016 | Yap | |
| 2002/0089137 A1 | 7/2002 | Chang et al. | |
| 2007/0007744 A1* | 1/2007 | Colman | B62K 15/008 280/278 |
| 2007/0013162 A1 | 1/2007 | Whyte | |
| 2007/0210556 A1* | 9/2007 | Hon | B62K 15/008 280/287 |
| 2007/0290479 A1* | 12/2007 | Tong | B62K 15/008 280/278 |
| 2009/0058038 A1* | 3/2009 | Dodman | B62K 25/32 280/274 |
| 2010/0044137 A1 | 2/2010 | Atherton et al. | |
| 2011/0025016 A1 | 2/2011 | Ivaaijer | |
| 2012/0018968 A1 | 1/2012 | Joslin et al. | |
| 2012/0080859 A1 | 4/2012 | Tai | |
| 2012/0104714 A1 | 5/2012 | Sapir | |
| 2012/0256386 A1 | 10/2012 | Benarrouch | |
| 2012/0292882 A1 | 11/2012 | Ghisolfi et al. | |
| 2014/0008882 A1 | 1/2014 | Liao | |
| 2016/0016630 A1* | 1/2016 | Thompson | B62K 15/008 280/287 |
| 2016/0288857 A1* | 10/2016 | Boutakis | B62K 3/02 |
| 2017/0066495 A1* | 3/2017 | Beistegui Chirapozu | B62K 15/008 |
| 2017/0247076 A1* | 8/2017 | Uimonen | B62K 21/12 |

FOREIGN PATENT DOCUMENTS

| | | |
|---|---|---|
| EP | 0505598 B1 | 6/1995 |
| EP | 1600368 A2 | 11/2005 |
| EP | 2492175 A1 | 8/2012 |
| WO | 8605155 A1 | 9/1986 |
| WO | 2004041631 A1 | 5/2004 |
| WO | WO-2016003260 A1 * | 1/2016 ............. B62K 15/00 |

OTHER PUBLICATIONS

Bickerton Website, Jul. 24, 2013: http://www.bickertonportables.co.uk.
Birdy Bike Website, Jul. 24, 2013: http://www.birdybike.com.
Chris Burns, 'Yanko Design—Form Beyond Function', www.yahnkodesign.com/2010/08/13/fold-you-saddle/ , Aug. 13, 2010.
Dahonbikes Website, May 8, 2013.
Designbuzz, Design Buzz Website: www.designbuzz.com/7-foldable-scooters-smart-effortless-transportation/ , Oct. 27, 2011.
Green Muze, GreenMuze website: www.greenmuze.com/climate/travel/1799-urban-scooter-fo-adults-.html/, Nov. 10, 2009.
Jango bikes website: www.jangobikes.com, Apr. 22, 2014.
Mike Hanlon, GizMag website: www.gizmag.com/myway-compact-smallest-fold-up-electric-scooter/22475/, May 9, 2012.
Vello Online Store, Retrieved from the Internet: URL:https://www.vellobike.com/product-page/vello-bike-chain-drive [retrieved on Dec. 3, 2018].
Pacific Cycles website: www.pacific-cycles.com/product2.asp?cat1=1&cat2=7 . Apr. 24, 2014.
StigoBike website: stigobike.com/ , Apr. 3, 2014.
Ahooga E-Shop, Retrieved from the Internet: URL:https://ahooga.bike/e-shop/ [retrieved on Dec. 3, 2018].
Blix Electric Bikes, Retrieved from the Internet: URL:https://blixbike.com/products/vikaplus-foldable?variant=15191523075 [retrieved on Dec. 3, 2018].
Brompton Bikes, retrieved from internet URL: https://www.brompton.com/bikes/brompton-electric, {retrieved on Dec. 3, 2018].
Hummingbird Electric Bikes, Retrieved from the Internet: URL:https://www.hummingbirdbike.com/shop-1/electric-bike [retrieved on Dec. 3, 2018].

* cited by examiner

COMPACT FOLDING ELECTRIC BICYCLE

CROSS REFERENCE TO RELATED APPLICATIONS

This application claims the priority benefit of U.S. Provisional Application No. 62/612,192 filed on Dec. 29, 2017 which is incorporated herein by reference in its entirety.

SUMMARY

The disclosure describes a vehicle configurable between an expanded arrangement and a folded arrangement. The vehicle includes a front wheel, a steering tube, a main frame member, a rear wheel assembly, a seat stays clamp, a handlebar, a quick release clamp and a rear wheel carrier mount. The front wheel defines a vertical longitudinal plane and is rotatably and removably mounted in a front fork at a front axle defining a vertical transverse plane orthogonal to the vertical longitudinal plane. The front wheel quick release skewer is configured to couple the front wheel to and decouple the front wheel from the front fork. The steering tube has a proximal end pivotably coupled with a distal end by a steering tube hinge and the distal end is configured to receive the front fork. The main frame member has a head tube configured to receive the steering tube, a seat tube distal from the head tube and a bottom bracket configured to receive a crankset. The rear wheel assembly includes a rear wheel carrier pivotably coupled with the seat tube by a rear wheel assembly hinge and is selectively coupled with the seat tube by seat stays. A rear wheel is held by rear wheel carrier and defines a rear vertical longitudinal plane and has a rear wheel axle defining a rear vertical transverse plane orthogonal with the rear vertical longitudinal plane. The rear wheel assembly is configured to pivot about the rear wheel assembly hinge downwardly and forwardly into a position directly underneath and proximal to the main frame member. The seat stays clamp is configured to selectively couple the seat stays to an upper portion of the seat tube. The handlebar is coupled with the proximal end of the steering tube and is configured to, in the folded arrangement, pivot down and extend between the main frame member and the front fork while, in profile, not extending beyond the main frame member and the front fork. The quick release clamp is configured to enable selective pivoting of the handlebar relative to the steering tube about a pivot axis of steering tube hinge to a position alongside the rear wheel. The rear wheel carrier mount is provided to the rear wheel carrier and configured for removable coupling of the front axle with the front wheel removed from the front fork.

The disclosure further describes a method for configuring a vehicle between an expanded arrangement and a folded arrangement. The method includes providing a vehicle having a front wheel, a steering tube, a main frame member and a rear wheel assembly. The front wheel defines a vertical longitudinal plane and is rotatably and removably mounted in a front fork at a front axle defining a vertical transverse plane orthogonal to the vertical longitudinal plane. The steering tube has a proximal end pivotably coupled with a distal end by a steering tube hinge and a distal end configured to receive the front fork. The main frame member has a head tube configured to receive the steering tube, a seat tube distal from the head tube and a bottom bracket configured to receive a crankset. The rear wheel assembly includes a rear wheel carrier pivotably coupled with the seat tube by a rear wheel assembly hinge and is selectively coupled with the seat tube by seat stays. A rear wheel held by the rear wheel carrier defines a rear vertical longitudinal plane and has a rear wheel axle defining a rear vertical transverse plane orthogonal with the rear vertical longitudinal plane. The method further includes removing the front wheel from the front fork, unfastening a seat stays clamp configured to selectively couple the seat stays to an upper portion of the seat tube and with gravitational aid, pivoting the rear wheel assembly relative to the main frame member about a rear wheel assembly hinge in a vertical plane coincident with the rear vertical longitudinal plane. A handlebar is folded down to lie alongside the rear wheel and, with a front wheel quick release skewer, the front wheel is secured to a rear wheel carrier mount provided on at least one side of the rear wheel carrier.

BRIEF DESCRIPTION OF THE FIGURES

The summary above, as well as the following detailed description of illustrative embodiments, is better understood when read in conjunction with the appended figures. For the purpose of illustrating the disclosure, example constructions are shown in the figures. However, the disclosure is not limited to specific methods and instrumentalities disclosed herein. Moreover, those having ordinary skill in the art will understand that the figures are not to scale. Wherever possible, like elements have been indicated by identical numbers.

Embodiments of the disclosure will now be described, by way of example only, with reference to the following diagrams wherein.

DETAILED DESCRIPTION

Figure 1:
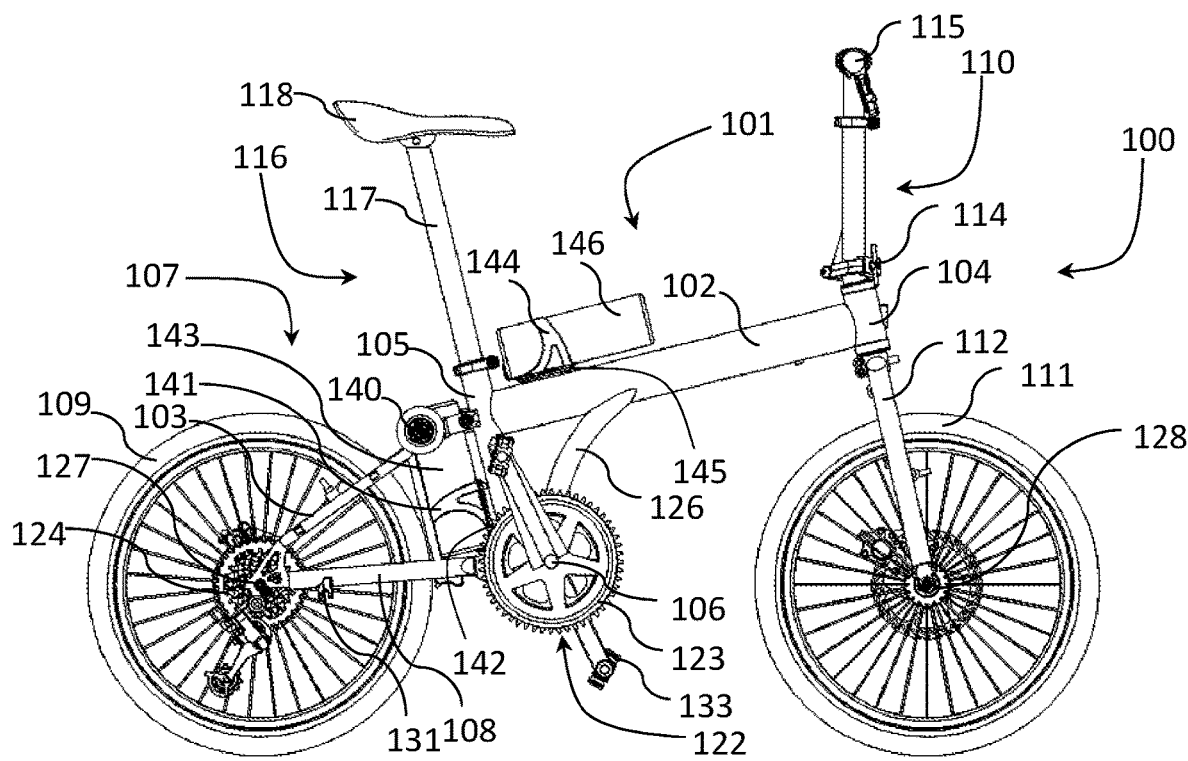
FIG. 1 illustrates a right-side, orthogonal view of an example foldable vehicle in an expanded arrangement.

The following detailed description illustrates embodiments of the disclosure and manners by which they can be implemented. Although the best mode of carrying out disclosed systems, apparatuses and methods has been described, those of ordinary skill in the art would recognize that other embodiments for carrying out or practicing disclosed systems, apparatuses and methods are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Embodiments of the disclosure provide a compact folding vehicle with a rear wheel with a hub motor, a first battery carrier mounted behind the seat tube for accommodating a first battery module, and a second battery carrier mounted on top of the main frame member for accommodating a second battery module. The bicycle is folded by swinging the rear wheel assembly within the rear vertical longitudinal plane about a pivot, until the rear wheel is disposed below and almost touching the main frame member. The front wheel may be removed and mounted by the axle on a rear wheel carrier of the bicycle.

The handlebar assembly is folded about a steerer hinge such that the handlebar lies proximal to the rear wheel. When viewed from the side, the folded rear wheel partially overlaps the front fork, and the folded handlebar is completely overlapped by the main frame member, front fork, and rear wheel. In a folded position, with the seat post retracted, the rear wheel is prevented by the seat post from unfolding when the bike is lifted.

In the folded position, the bike can be supported in the upright position by the rear wheel and two roller wheels and can be rolled forward on the rear wheel and the two roller wheels. In the folded position, the bike fits into a box with sides of length not greater than one and a half times the diameter of the wheels, and a depth not greater than the sum of the length of the front wheel skewer and the length of the rear wheel axle.

Further, embodiments provide a compact folding vehicle with electric power assist that can accommodate batteries with different sizes and capacities, while keeping the weight of the batteries close to the central area of the frame. The batteries may be readily removed for charging and safe storage.

Still further, embodiments provide a small folded package while maintaining directional stability. A greater head tube angle combined with a smaller fork offset increases trail and shortens the wheelbase by moving a front wheel backward. The result is a folded bicycle that is more compact lengthwise.

Additional aspects, advantages, features and objects of the disclosure will be made apparent from the figures and the detailed description of the illustrative embodiments construed in conjunction with the appended claims that follow.

It will be appreciated that described features are susceptible to being combined in various combinations without departing from the scope of the disclosure as defined by the appended claims.

Figure 2:
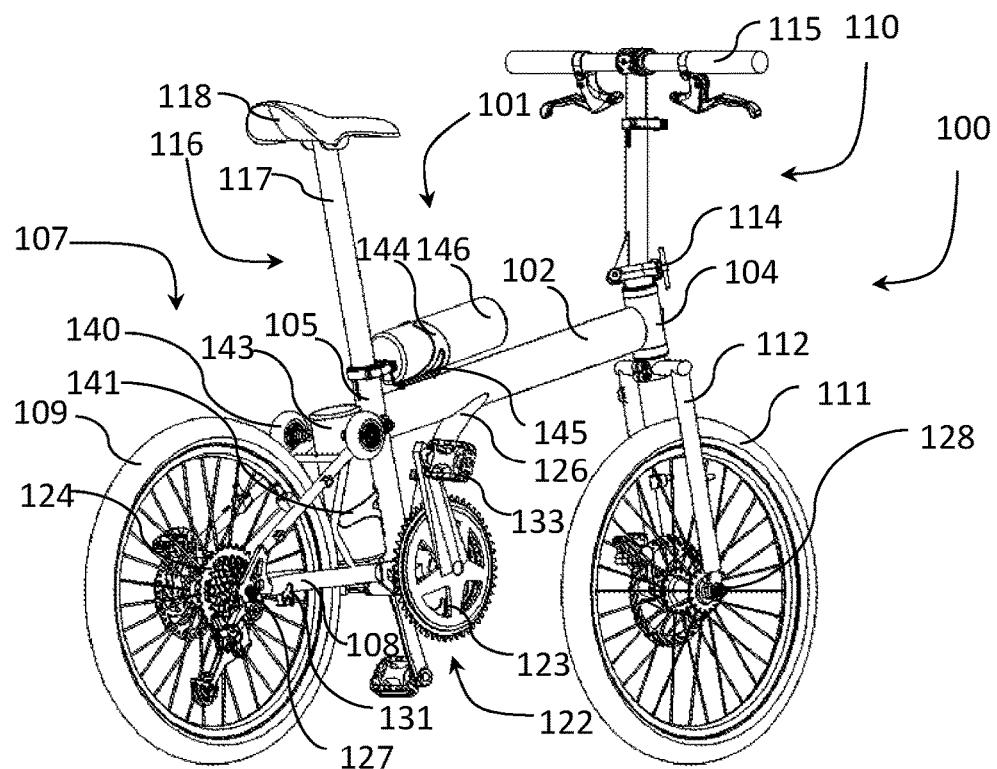
FIG. 2 illustrates a right-side, perspective view of an example foldable vehicle in an expanded arrangement.
Figure 3:
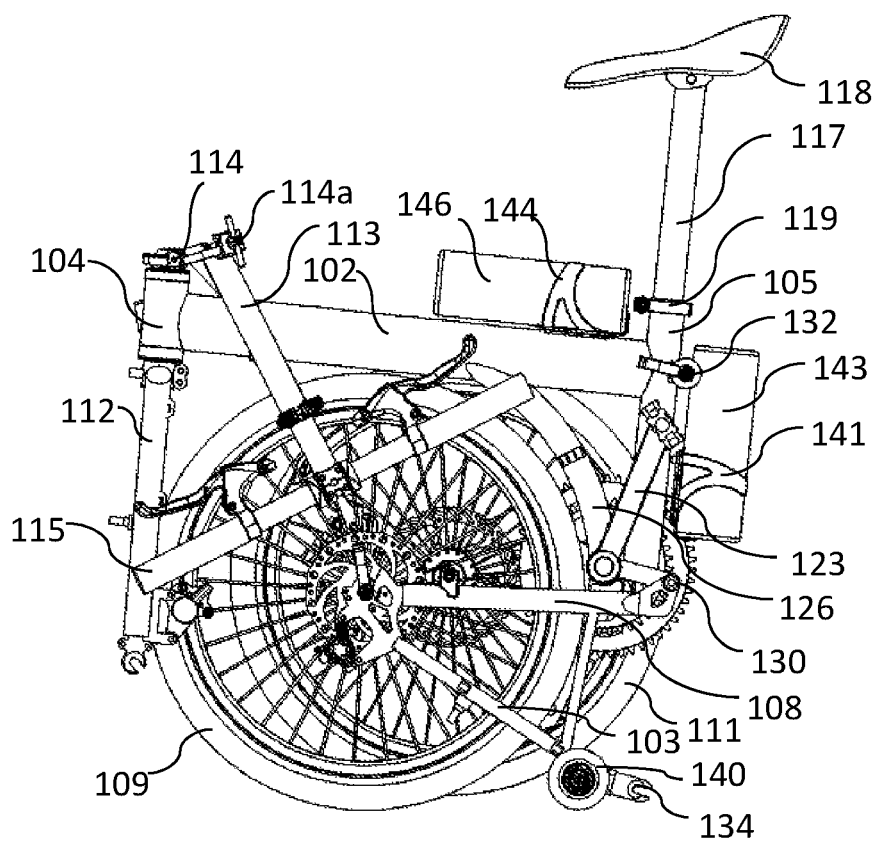
FIG. 3 illustrates a left-side view of an example foldable vehicle in a folded configuration.
Figure 4:
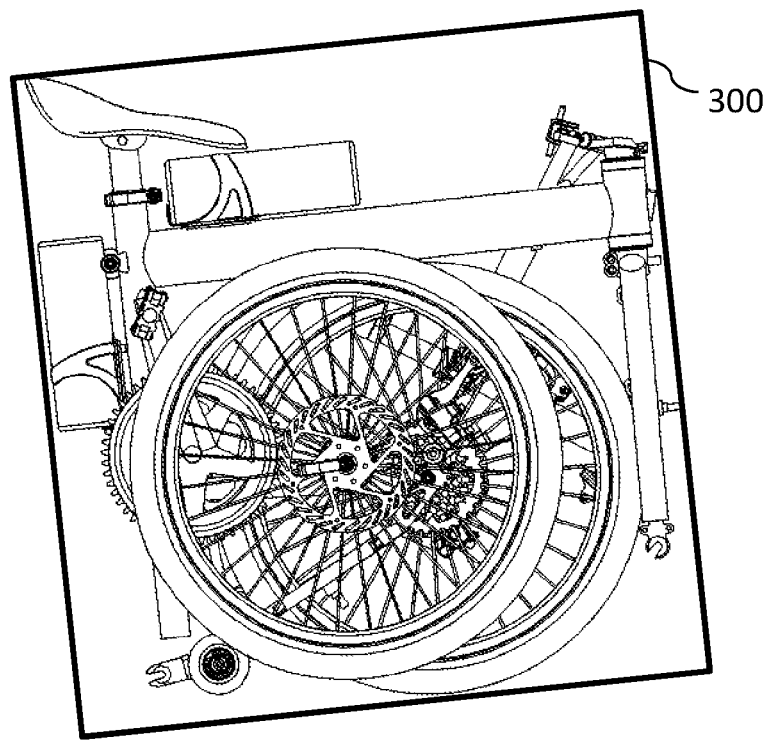
FIG. 4 illustrates a right-side view of an example foldable vehicle in a fully folded configuration bounded by a square.
Figure 5:
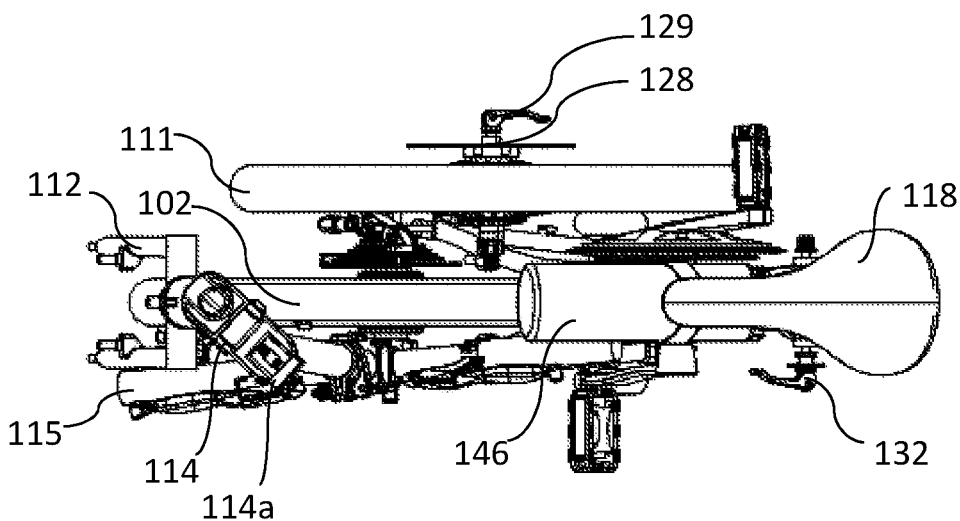
FIG. 5 illustrates a top view of an example foldable vehicle in the folded configuration.

FIGS. 1 & 2 illustrate a right-side views of an example foldable vehicle in an expanded arrangement and FIGS. 3-5 illustrate an example foldable vehicle in the folded configuration.

A vehicle in the form of an electric bicycle 100 is configurable between an expanded arrangement and a folded arrangement. Bicycle 100 includes a main frame assembly 101, a steering wheel assembly 110 and a rear wheel assembly 107.

The main frame assembly 101 has a head tube 104 configured to receive a front fork 112, a seat tube 105 distal from the head tube 104 and a bottom bracket 106 configured to receive a crankset 123.

Main frame assembly 101 includes a main frame member 102 extending substantially from a head tube 104 at the front end to a seat tube 105 distal from head tube 104 at the bicycle rear end. Head tube 104 is configured to receive the front fork 112 and is hollow and open at both ends to enable rotatable coupling with a steering tube 113 (described below). Seat tube 105 extends downwardly between the main frame member 102 and the rearward side of bottom bracket 106.

A down tube 126 extends from a position proximal to the center of main frame member 102 downwardly and rearwardly to bottom bracket 106 configured to carry crankset 123 which forms part of the bicycle's transmission assembly 122. Bicycle transmission assembly 122 includes crankset 123 rotatably mounted on bottom bracket 106 and operatively coupled with rear gear sprockets 124 on rear wheel 109 by a chain or a belt (not shown).

Main frame assembly 101 may be formed from any of a variety of materials and may take any of a variety of shapes, for example, main frame assembly 101 may be formed as a hollow metal or composite body. The main frame member may be generally straight and linear or may be slightly curved but, for example, is generally angled relative to a horizontal plane when resting upright on wheels 109 and 111 in the expanded arrangement.

The main frame member 102 may be configured without any hinge such that the seat tube 105 maintains a given angle with the head tube 104 during configuration between the expanded and folded arrangements.

Rear wheel assembly 107 disposed at the rearward end of main frame assembly 101 includes rear wheel carrier 108 pivotably coupled with seat tube 105 by a rear wheel assembly hinge 130 and selectively secured with an upper portion of seat tube 105 by seat stays 103. A rear wheel 109 is held by rear wheel carrier 108 and, with its circumference, defines a rear vertical longitudinal plane and having a rear wheel axle 127 defining a rear vertical transverse plane orthogonal with the rear vertical longitudinal plane. Rear wheel 109 is rotatably coupled to rear wheel carrier 108 at a hub of wheel 109 by way of an axle 127. Rear wheel assembly hinge 130 allows rear wheel assembly 107 to pivot about a horizontal hinge axis parallel to the intersection between a horizontal plane (parallel with a surface supporting both front and rear wheels 111 and 109) and the rear vertical transverse plane. Rear wheel assembly 107 may be configured to pivot about rear wheel assembly hinge 130 downwardly and forwardly into a position directly underneath and proximal to main frame member 102 (FIGS. 3-5).

Rear wheel carrier 108 may be formed from any of a variety of materials and take any of a variety of geometries, for example rear wheel carrier 108 may be formed as a hollow metal or composite body.

Seat stays clamp 132 is configured to selectively couple seat stays 103 to main frame assembly 101 at an upper portion of seat tube 105. Unfastening seat stays clamp 132 disengages a rear frame latch 134 and allows rear wheel assembly 107 to be pivoted between an operative expanded, riding position disposed at the rearward end of the bicycle and a compact folded position under main frame assembly 101.

Referring to FIGS. 1-3, bicycle 100 includes a seat assembly 116 with a seat post 117 configured to hold a seat 118 at a top end. Seat post 117 is slidably engageable within seat tube 105 of main frame assembly 101 and capable of extension or retraction relative thereto thus enabling comfortable positioning for a rider in the expanded arrangement as well as reduced dimensions in the folded arrangement.

Seat post 117 may be selectively secured at any of a variety of positions within seat tube 105 by a fastening mechanism 119 (FIG. 3). Suitable fastening mechanisms 119 may include but are not limited to clamps such as a quick-release clamp. With bicycle 100 in the expanded, riding arrangement, seat post 117 is partially inserted into seat tube 105 and secured by fastening mechanism 119.

Steering assembly 110, disposed at the front end of main frame assembly 101, includes a front wheel 111 defining a vertical longitudinal plane with its circumference. For example, the vertical longitudinal plane may be parallel with the plane formed from an othographic projection of line 200 of FIG. 8. Front wheel 111 is rotatably and removably mounted in a front fork 112 at a front axle 128 defining a vertical transverse plane orthogonal to the vertical longitudinal plane. A front wheel quick release skewer 129 is configured to couple front wheel 111 to and decouple front wheel 111 from front fork 112.

A handlebar 115, which extends generally parallel with the front vertical transverse plane, is configured for secure receipt in steering tube 113 which, in turn, is rotatably coupled with head tube 104. Steering tube 113 includes a distal portion 113b configured for receipt by the head tube 104 and a proximal portion 113a. Rotatable coupling with head tube 104 allows for rotation of steering assembly 110 about the longitudinal axis of head tube 104 to thereby change the angle of the front vertical longitudinal plane to steer bicycle 100.

A steering tube hinge 114 provides for pivoting of proximal end 113a of steering tube 113 relative to distal end 113b. A quick release clamp 114a is configured to lock against or disable pivoting of proximal end 113a of steering tube 113 relative to distal end 113b of steering tube 113 about a pivot axis 114b of steering tube hinge 114. The steering tube hinge 114 may enable folding of handlebar 115 alongside rear wheel 109 (FIGS. 3-5).

Figure 6:
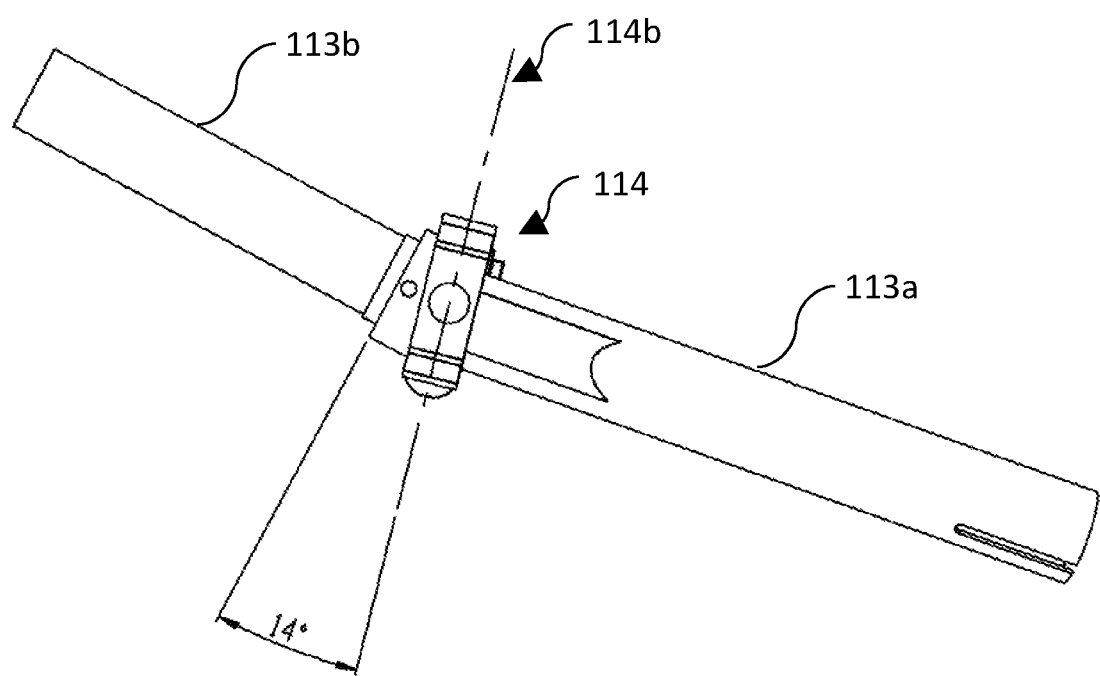
FIG. 6 illustrates a detail view of a steering tube and associated hinge.
Figure 8:
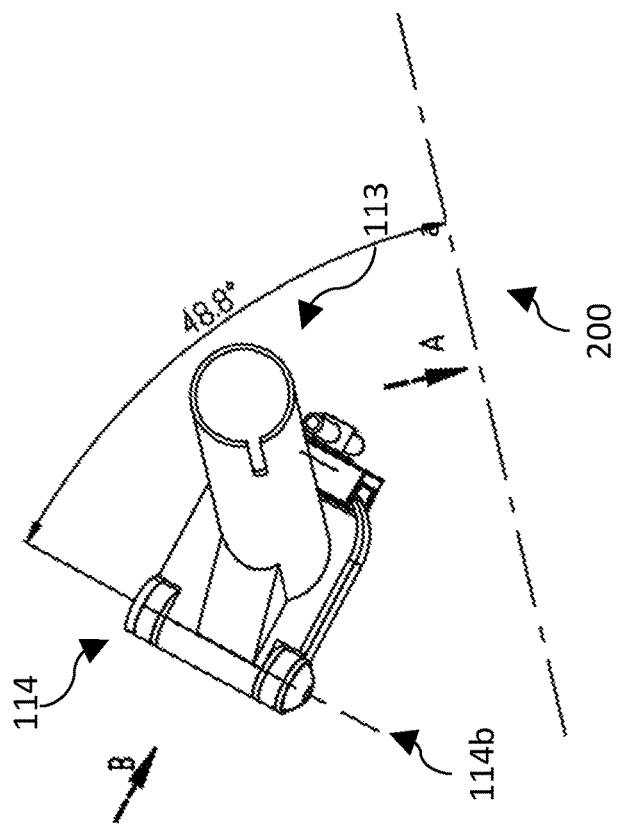
FIG. 8 illustrates another detail view of the steering tube and associated hinge.
Figure 7:
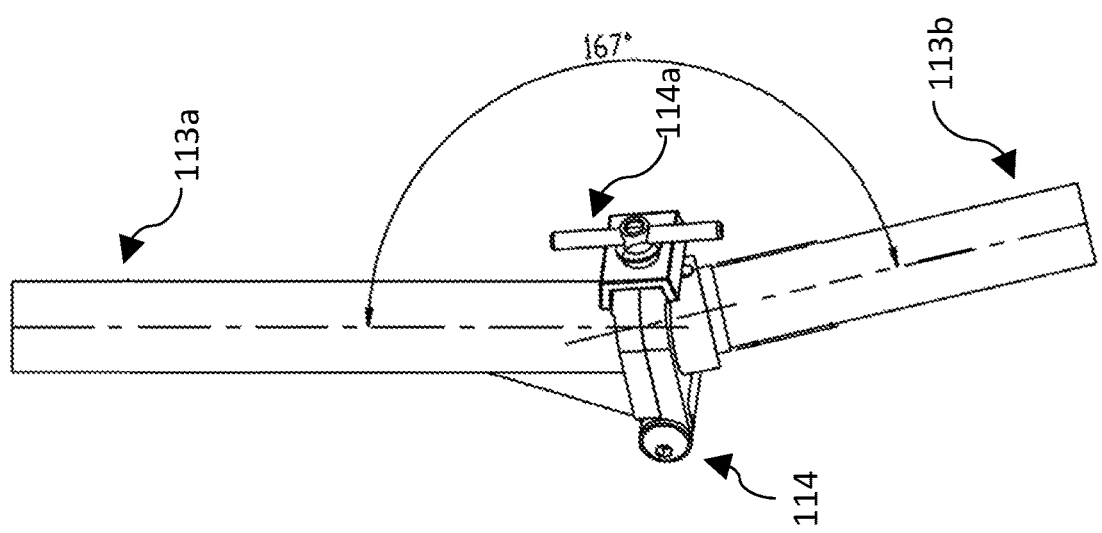
FIG. 7 illustrates another detail view of the steering tube and associated hinge.

The steering tube pivot axis extends at an angle relative to the front vertical transverse plane and at an angle relative to the plane perpendicular to the head tube longitudinal axis. FIGS. 6-8 illustrate detail views of steering tube 113 and associated hinge 114. Steering tube 113 may extend at an angle of about 170 degrees to head tube 104. In an example, steering tube 113 extends at an angle of about 167 degrees to head tube 104. Steering tube hinge 114 may exhibit a pivot axis forming an angle of about 50 degrees with the vertical longitudinal plane and 15 degrees with a horizontal plane orthogonal to both the vertical longitudinal plane and the vertical transverse plane. In an example, the angle formed by the pivot axis with the vertical longitudinal plane is about 48.8 degrees. In an example, the angle formed by the pivot axis with the horizontal plane is about 14 degrees.

A rear wheel carrier mount 131 is provided to rear wheel carrier 108 and is configured for removable coupling of front axle 128 with front wheel 111 removed from front fork 112.

Figure 9:
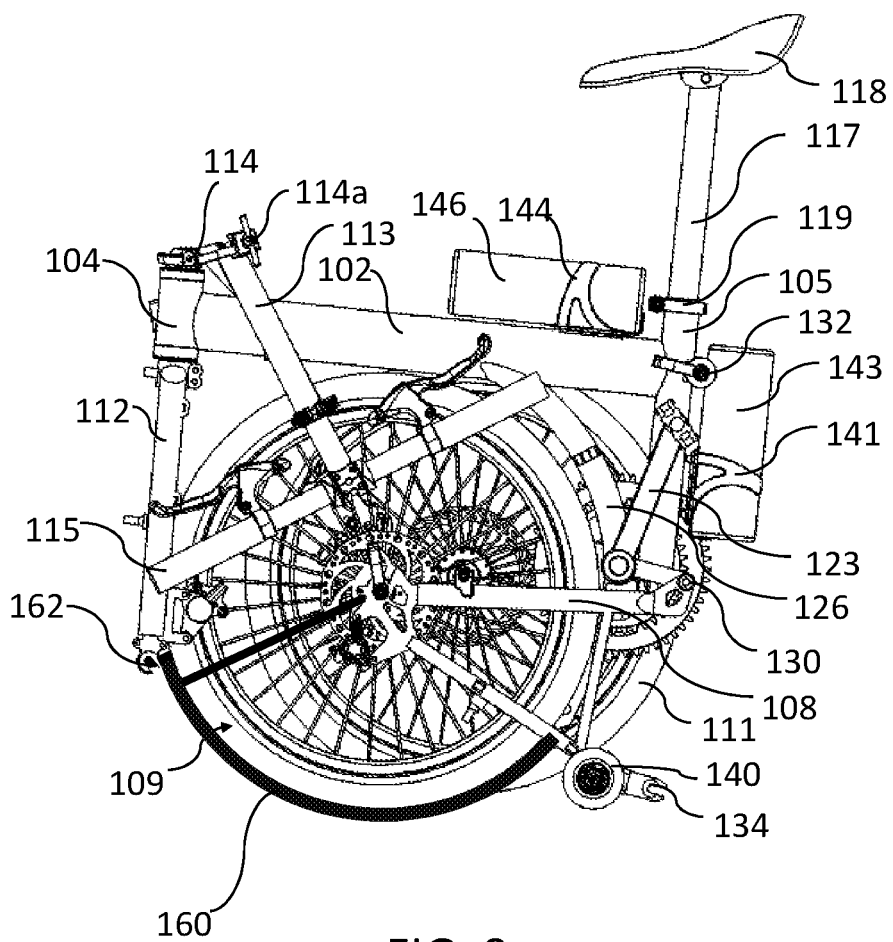
FIG. 9 illustrates a left-side view of an example vehicle with rear wheel fender.
Figure 10:
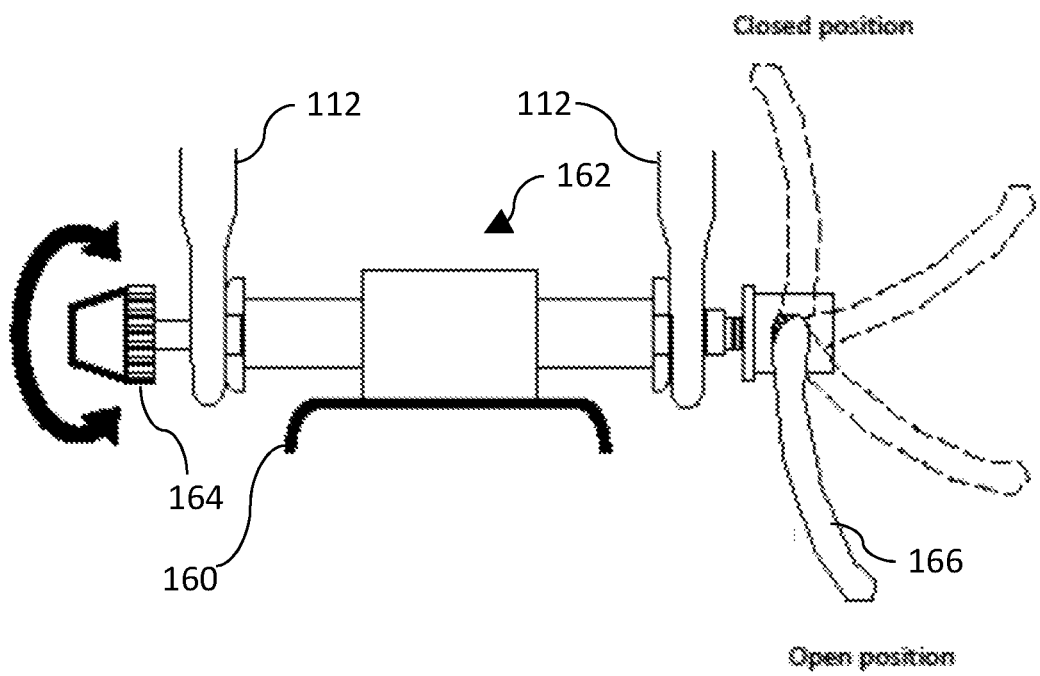
FIG. 10 illustrates a front, detail view of an example rear wheel fender.

The vehicle may further include, configured to partially surround a portion of the rear wheel 109, a rear wheel mud guard or fender 160. FIG. 9 illustrates an example bicycle 100 with fender 160 and FIG. 10 illustrates a detail view of fender 160. Fender 160 is coupled with seat stays 103 and includes a post 162 for locking receipt within fork ends of front fork 112 when rear wheel assembly 107 is pivoted to the position directly underneath and proximal to main frame member 102. In an example, post 162 includes a dial 164 to adjust clamping force exerted on fork ends of front fork 112 and a quick-release lever 166 pivotable between open and closed positions. For example, in the open position fender post 162 may be received in fork ends of front fork and be withdrawn therefrom while, in the closed position, fender post 162 is locked into the fork ends.

Bicycle 100 may further include at least one battery 143 mounted to seat tube 105 by first battery carrier 141 at the rear side of seat tube 105. For example, battery carrier 141 and battery 143 are mounted to seat tube boss 142 and are positioned to be between seat stays 103 when rear wheel carrier 108 is coupled with seat tube 105. Battery carrier 141 may be affixed to seat tube boss 142 by fasteners such as screws, bolts, nuts, or clips and accommodate a battery module 143 which may include a port for charging and discharging.

A second battery carrier 144 is adapted to mount on the top side of main frame member 102, for example, to main tube boss 145. Affixing to main tube boss 145 may be achieved with fasteners such as screws, bolts, nuts, or clips. Second battery carrier 144 may accommodate a second battery module 146 which includes a port for charging and discharging. Battery carriers 141 and 144 may be made of any of a variety of lightweight, durable materials having sufficient rigidity and strength to support a load including but not limited to metal or plastic. Battery carriers 141 and 144 may be formed using a mold, CNC machining, 3D printing or by other common manufacturing process depending, in part, on the material used.

Each of battery modules 143 and 146 may be formed of multiple battery cells electrically connected and encased in a protective housing having output terminals that provide electrical power at a rated voltage and current. In one example, battery modules 143 and 146 have cylindrical bottle profiles and can be readily attached to or removed from battery carrier 141 or 144 which resemble a common bicycle water bottle holder.

In use, each of battery modules 143 and 146 is connected to a motor controller (not shown) by wires and/or connectors and/or a wiring harness. In an example, the motor controller could be integrated into the battery carrier 142 or 144. In another example, each of battery modules 143 and 146 may include a motor controller within its housing. In yet another example, the motor controller could be encased in a hub of a bicycle wheel.

The motor controller is in turn connected by wires and/or connectors and/or a wiring harness to a hub motor drivingly engaged with a wheel of the bicycle 100. In an example, the hub motor is drivingly engaged with rear wheel 109 of bicycle 100. Electrical power is supplied by either battery module 143 or battery module 146, or concurrently with both battery modules connected in parallel. In one example, the source of the power supply is determined by the state of an on/off switch on the battery module. The motor controller controls the function of the hub motor to turn wheel 109.

The battery modules 143 and 146, the motor controller and the hub motor may be components of an electric bicycle kit that may be sourced from original equipment manufacturers.

Figure 11:
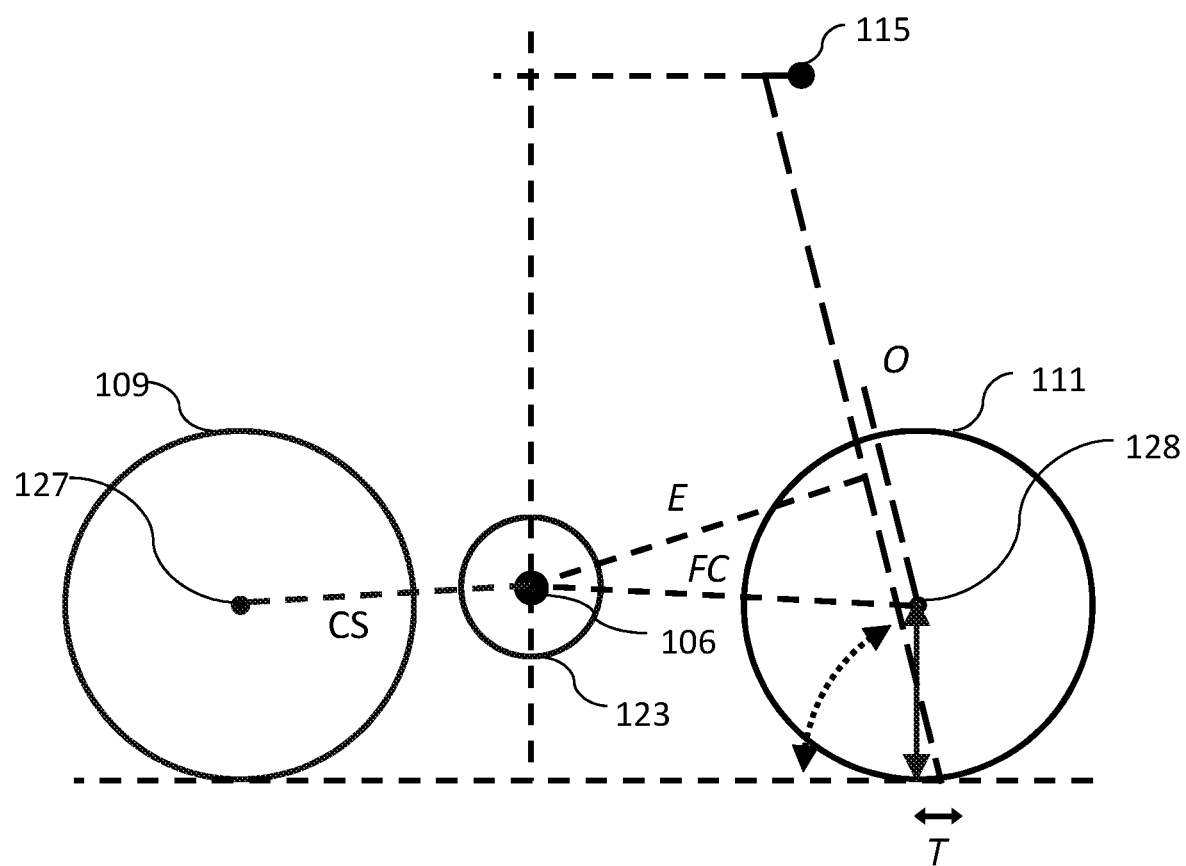
FIG. 11 illustrates a schematic of example geometries of a foldable vehicle in an expanded arrangement.

FIG. 11 illustrates a schematic of example geometries of a foldable vehicle in an expanded arrangement. Directional stability of bicycles and other two-wheeled vehicle is strongly influenced by the length of the trail which is determined by the wheel size, head tube angle (angle of the steering axis), and fork offset (distance from the center of the front wheel to the steering axis). A smaller front wheel reduces the length of the trail reducing directional stability relative to normal road bikes with big wheels. Using a smaller head tube angle to increase the trail on a bicycle with a small front wheel, as is commonly done with existing designs, has the effect of lengthening the wheelbase by moving the front wheel forward. Such a bicycle may be unnecessarily long when folded.

Bicycle 100 makes use of a greater head tube angle combined with a smaller fork offset to increase trail and shorten the wheelbase by moving front wheel 111 backward.

The result is a folded bicycle that is more compact lengthwise. In an example, a ratio of a distance E between the bottom bracket 106 and a center of the front wheel 111 to chainstay length CS is between about 1 and about 1.5. In an example, a ratio of a diameter of front wheel 111 to a fork offset O added to a perpendicular distance FC between the bottom bracket 106 and the steering axis is between about 0.9 and about 1.1. In an example, a ratio of the trail T of front wheel 111 to the front wheel diameter is between about 0.10 and about 0.12. In an example, bicycle 100 assumes a folded package configured to fit within a box with sides of length not greater than one and a half times a diameter of either of front wheel 111 or rear wheel 109.

In an example method, in order to provide a vehicle, a first battery carrier 141 is mounted to a seat tube boss 142 of a bicycle 100, a first battery module 143 is attached to battery carrier 141 and disposed between seat tube 105 and rear wheel 109, and a motor controller and a motor are integrated into a hub of rear wheel 109. With components appropriately coupled, the motor controller may be turned on or activated such that the hub motor is powered and drives rear wheel 109 to propel bicycle 100 forward. Power delivery from the hub motor to rear wheel 109 may be inactive without input either from the user or from one or more sensors. In an example, input from the user takes the form of activation of a manual throttle and input from one or more sensors may include speed and driving torque of rear wheel 109.

According to a method for configuring an example vehicle between an expanded arrangement and a folded arrangement, a user may first unfasten front wheel quick release skewer 129 and remove front wheel 111 from front fork 112 of bicycle 100.

Seat stays clamp 132 is then unfastened so as to decouple seat stays 103 from an upper portion of seat tube 105. Relative to main frame member 102 and with gravitational aid, rear wheel assembly 107 is pivoted about rear wheel assembly hinge 130 in a vertical plane coincident with the rear vertical longitudinal plane.

The motion of any point on rear wheel assembly 107 about the hinge axis of rear wheel assembly hinge 130 (at the pivot end) lies in a plane which is substantially coincident with the vertical longitudinal plane of bicycle 100 in its operative riding position. The vertical pivot plane being parallel to the bicycle longitudinal plane effectively causes rear wheel 109 to move to a position underneath main frame member 102 as it is pivoted through approximately 180 degrees from the expanded arrangement to the folded arrangement. The angle of the hinge axis and the angular pivot range of rear wheel assembly 107 may differ from the previously mentioned, depending on the width dimensions of the various parts of the bicycle and its specific geometry.

In an example in which main frame member 102 is substantially rigid, seat tube 105 is maintained at a given angle with head tube 104 during configuration between the expanded and folded arrangements.

In another example, rear wheel assembly 107 may be pivoted into engagement with fork ends of front fork 112 with a post feature 162 of a fender 160 coupled with seat stays 103 and configured to partially surround a portion of rear wheel 109.

Quick release clamp 114a of steering tube hinge 114 is unfastened and handlebar 115 is folded down to lie alongside rear wheel 109. In an example, handlebar 115 may be folded about a pivot axis forming an angle of about 50 degrees with the vertical longitudinal plane and 15 degrees with a horizontal plane orthogonal to the vertical longitudinal plane and the vertical transverse plane. In a further example, handlebar 115 may be folded such that handlebar 115 extends between main frame member 102 and front fork 112 and, in profile, does not extend beyond main frame member 102 and the front fork 112.

Complete folding of steering tube 113 positions handlebar 115 to lie alongside rear wheel 109 with one end touching front fork 112 and the other end touching main frame member 102 or down tube 126. Furthermore, in the folded configuration, handlebar 115 is completely overlapped by main frame member 102, front fork 112, and rear wheel 109.

With front wheel quick release skewer 129, front wheel 111 is secured on a rear wheel carrier mount 131 provided on at least one side of rear wheel carrier 108. In an example, front wheel 111 is secured with front wheel quick release skewer 129 such that front wheel 111 almost fully overlaps rear wheel carrier 108 when viewed from a line of sight parallel with rear wheel axle 127. Front wheel 111 is configured such that the longitudinal vertical plane lies within a plane approximately parallel to and spaced apart from the rear longitudinal vertical plane. In another example, the front wheel may be secured with quick release skewer 129 to one side of rear wheel carrier 108 such that handlebar 115 is between front wheel 111 and rear wheel 109.

Configuring a vehicle between an expanded arrangement and a folded arrangement may further include pivoting and securing such that the vehicle fits within a box having sides of length not greater than one and a half times a diameter of front wheel 111.

As an additional characteristic when bicycle 100 is in the folded arrangement, the front vertical transverse plane is spaced apart from the rear vertical transverse plane such that axles 127 and 128 are offset (FIG. 5). By offsetting wheel axles 127 and 128 while keeping the front vertical longitudinal plane parallel to rear vertical longitudinal plane, the front vertical longitudinal plane and the rear vertical longitudinal plane are spaced apart by a distance not greater than the sum of one-half of the length of front wheel axle 128 and one-half of the length of rear wheel axle 127. Thus, front wheel 111 may be positioned close to rear wheel assembly 107 offering a relatively small width dimension in the folded arrangement.

The bicycle pedals 133 may be folded or quickly detached to further reduce the width of the folded package such that bicycle 100 assumes a folded package having a width less than a sum of a length of the front wheel axle 128 and a length of the rear wheel axle 127.

The bicycle may then be secured in the folded arrangement. The folded bicycle 100 may be parked in an upright position, supported by rear wheel 109 and two roller wheels 140. It can also be rolled forward on rear wheel 109 and roller wheels 140.

In a fully folded position, bicycle 100 fits into a box 300 with sides of length not greater than one and a half times the diameter of the wheels (FIG. 4), and a depth not greater than the sum of the length of front wheel skewer 129 and the length of rear wheel axle 127.

Return of vehicle to the expanded arrangement may be achieved by reversing the folding action and re-securing all hinges and fastening or locking means.

The actions of disclosed methods are only illustrative and other alternatives can also be provided where one or more actions are added, one or more actions are removed, or one or more actions are provided in a different sequence without departing from the scope of the claims herein.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. A vehicle configurable between an expanded arrangement and a folded arrangement, comprising:
    a front wheel defining a vertical longitudinal plane and rotatably and removably mounted in a front fork at a front axle defining a vertical transverse plane orthogonal to the vertical longitudinal plane;
    a front wheel quick release skewer configured to couple the front wheel to and decouple the front wheel from the front fork;
    a steering tube having a proximal end pivotably coupled with a distal end by a steering tube hinge, the distal end configured to receive the front fork;
    a main frame member having a head tube configured to receive the steering tube, a seat tube distal from the head tube and a bottom bracket configured to receive a crankset;
    a rear wheel assembly including a rear wheel carrier pivotably coupled with the seat tube by a rear wheel assembly hinge and selectively coupled with the seat tube by seat stays and a rear wheel held by rear wheel carrier and defining a rear vertical longitudinal plane and having a rear wheel axle defining a rear vertical transverse plane orthogonal with the rear vertical longitudinal plane, the rear wheel assembly being configured to pivot about the rear wheel assembly hinge downwardly and forwardly into a position directly underneath and proximal to the main frame member; a seat stays clamp configured to selectively couple the seat stays to an upper portion of the seat tube;
    a handlebar coupled with the proximal end of the steering tube and configured to, in the folded arrangement, pivot down and extend between the main frame member and the front fork while, in profile, not extending beyond the main frame member and the front fork;
    a quick release clamp configured to enable selective pivoting of the handlebar relative to the steering tube about a pivot axis of steering tube hinge to a position alongside the rear wheel; and
    a rear wheel carrier mount provided to the rear wheel carrier and configured for removable coupling of the front axle with the front wheel removed from the front fork.

2. The vehicle as set forth in claim 1, wherein the steering tube hinge exhibits a pivot axis forming an angle of about 50 degrees with the vertical longitudinal plane and 15 degrees with a horizontal plane orthogonal to both the vertical longitudinal plane and the vertical transverse plane.

3. The vehicle as set forth in claim 1, wherein the steering tube extends at an angle of about 170 degrees to the head tube.

4. The vehicle as set forth in claim 1, further comprising, configured to partially surround a portion of the rear wheel, a fender coupled with the seat stays and including a post for locking receipt within fork ends of the front fork when the rear wheel assembly is pivoted to the position directly underneath and proximal to the main frame member.

5. The vehicle as set forth in claim 1, wherein the main frame member is configured such that the seat tube maintains a given angle with the head tube during configuration between the expanded and folded arrangements.

6. The vehicle as set forth in claim 1, wherein the vehicle assumes a folded package having a width less than a sum of a length of the front wheel axle and a length of the rear wheel axle.

7. The vehicle as set forth in claim 1, wherein the vehicle assumes a folded package configured to fit within a box with sides of length not greater than one and a half times a diameter of the front wheel or the rear wheel.

8. The vehicle as set forth in claim 1, further comprising at least one battery mounted to the seat tube, so as to be positioned between the seat stays when the rear wheel carrier is coupled with the seat tube.

9. The vehicle as set forth in claim 1, wherein a ratio of a distance between the bottom bracket and a center of the front wheel to chainstay length is between about 1 and about 1.5.

10. The vehicle as set forth in claim 9, wherein a ratio of a diameter of the front wheel to a fork offset added to a perpendicular distance between the bottom bracket and the steering axis is between about 0.9 and about 1.1.

11. The vehicle as set forth in claim 10, wherein a ratio of the trail of the front wheel to the front wheel diameter is between about 0.10 and about 0.12.

12. A method for configuring a vehicle between an expanded arrangement and a folded arrangement, comprising:
    providing a vehicle having:
        a front wheel defining a vertical longitudinal plane and rotatably and removably mounted in a front fork at a front axle defining a vertical transverse plane orthogonal to the vertical longitudinal plane;
        a steering tube having a proximal end pivotably coupled with a distal end by a steering tube hinge and a distal end configured to receive the front fork;
        a main frame member having a head tube configured to receive the steering tube, a seat tube distal from the head tube and a bottom bracket configured to receive a crankset;
        a rear wheel assembly including a rear wheel carrier pivotably coupled with the seat tube by a rear wheel assembly hinge and selectively coupled with the seat tube by seat stays and a rear wheel held by the rear wheel carrier and defining a rear vertical longitudinal plane and having a rear wheel axle defining a rear vertical transverse plane orthogonal with the rear vertical longitudinal plane;
    removing the front wheel from the front fork;
    unfastening a seat stays clamp configured to selectively couple the seat stays to an upper portion of the seat tube;
    relative to the main frame member and with gravitational aid, pivoting the rear wheel assembly about a rear wheel assembly hinge in a vertical plane coincident with the rear vertical longitudinal plane;
    folding a handlebar down to lie alongside the rear wheel; and
    with a front wheel quick release skewer, securing the front wheel to a rear wheel carrier mount provided on at least one side of the rear wheel carrier.

13. The method as set forth in claim 12, wherein pivoting the rear wheel assembly further comprises pivoting downwardly and forwardly into a position directly underneath and proximal to the main frame member.

14. The method as set forth in claim 12, wherein folding the handlebar down further comprises folding about a pivot axis forming an angle of about 50 degrees with the vertical longitudinal plane and 15 degrees with a horizontal plane orthogonal to the vertical longitudinal plane and the vertical transverse plane.

15. The method as set forth in claim 12, wherein securing the front wheel with the quick release skewer further comprises securing the front wheel such that the handlebar is between the front wheel and the rear wheel.

16. The method as set forth in claim 12, wherein securing the front wheel with the front wheel quick release skewer further comprises securing such that the front wheel almost fully overlaps the rear wheel carrier when viewed from the side.

17. The method as set forth in claim 12, further comprising maintaining the seat tube at a given angle with the head tube during configuration between the expanded and folded arrangements.

18. The method as set forth in claim 12, wherein pivoting the rear wheel assembly and securing the front wheel with the front wheel quick release skewer on the rear wheel carrier mount further comprises pivoting and securing such that the vehicle fits within a box having sides of length not greater than one and a half times a diameter of the front wheel.

19. The method as set forth in claim 12, wherein pivoting the rear wheel assembly further comprises engaging fork ends of the front fork with a post feature of a fender coupled with the seat stays and configured to partially surround a portion of the rear wheel.

20. The method as set forth in claim 12, wherein folding the handlebar down further comprises folding the handler bar down such that the handlebar extends between the main frame member and the front fork and, in profile, does not extend beyond the main frame member and the front fork without in the folded arrangement.

* * * * *